(12) United States Patent
Rice

(10) Patent No.: US 11,932,382 B2
(45) Date of Patent: Mar. 19, 2024

(54) ROTATING WING AIRCRAFT

(71) Applicant: Genesis Aerotech Limited, Fintona (GB)

(72) Inventor: Michael Rice, Fintona (GB)

(73) Assignee: Genesis Aerotech Limited, County Tyrone (GB)

( * ) Notice: Subject to any disclaimer, the term of this patent is extended or adjusted under 35 U.S.C. 154(b) by 0 days.

(21) Appl. No.: 17/635,034

(22) PCT Filed: Aug. 12, 2020

(86) PCT No.: PCT/EP2020/072683
§ 371 (c)(1),
(2) Date: Feb. 14, 2022

(87) PCT Pub. No.: WO2021/028510
PCT Pub. Date: Feb. 18, 2021

(65) Prior Publication Data
US 2022/0289367 A1 Sep. 15, 2022

(30) Foreign Application Priority Data
Aug. 12, 2019 (GB) ..................................... 1911498

(51) Int. Cl.
*B64C 27/18* (2006.01)
(52) U.S. Cl.
CPC .................................. *B64C 27/18* (2013.01)
(58) Field of Classification Search
CPC ..................................................... B64C 27/18
See application file for complete search history.

(56) References Cited

U.S. PATENT DOCUMENTS

| | | | |
|---|---|---|---|
| 3,904,313 A | 9/1975 | Bernaerts | |
| 8,931,728 B1* | 1/2015 | van der Westhuizen | B64C 27/26 244/6 |
| 2004/0000614 A1 | 1/2004 | Leyva et al. | |
| 2017/0066539 A1* | 3/2017 | van der Westhuizen | B64C 11/00 |
| 2018/0111680 A1 | 4/2018 | Fenny et al. | |
| 2018/0299067 A1 | 10/2018 | Swan et al. | |
| 2018/0319487 A1* | 11/2018 | Maier | B64C 27/325 |

FOREIGN PATENT DOCUMENTS

| | | |
|---|---|---|
| DE | 2414370 A1 | 10/1975 |
| EP | 1375864 A2 | 1/2004 |
| EP | 3312087 A1 | 4/2018 |
| JP | 3164738 U | 12/2010 |

OTHER PUBLICATIONS

International Search Report and Written Opinion for corresponding PCT/EP2020/072683 dated Nov. 17, 2020 (16 pp).

\* cited by examiner

*Primary Examiner* — Justin M Benedik
(74) *Attorney, Agent, or Firm* — Renner, Kenner; Arthur M. Reginelli

(57) ABSTRACT

A rotating wing aircraft 1 comprises: at least one rotor blade 2; a primary gas-flow production means 7 for providing a flow of gas in an internal passage 13 of the at least one rotor blade 2; and a reserve gas-flow production means 11 for providing a flow of gas in the internal passage 13 of the at least one rotor blade 2.

19 Claims, 7 Drawing Sheets

ROTATING WING AIRCRAFT

The present invention relates to helicopters. In particular, the present invention relates to the safety of 'tip jet' helicopters or reaction jet helicopters.

The production of lift and thrust by rotating wing aircraft relies on their ability to cause the rotor blades to rotate. During normal flying conditions this relies on reliable operation of the power train including the primary power source and/or engine. In the event of a catastrophic power failure, helicopter pilots typically rely on autorotation of the rotor blades to produce a safe landing. Autorotation is a power-off manoeuvre in which the rotor blades are driven solely by the upward flow of air through the rotor. During autorotation, the kinetic energy of the rotating blades is used to decrease the rate of descent. At the end of a power-off autorotative descent and shortly before reaching the ground, the pilot performs a flare maneuver wherein forward speed is reduced and rotor speed is increased to provide additional lift, softening the landing.

In conventional shaft-driven helicopters, the rotor blades are driven by a rotor shaft or 'mast' connected to an engine via a transmission. In order to enter an autorotation after an engine failure, it is necessary to decouple the engine from the rotor shaft so that the rotor blades can freely rotate under the influence of the upwardly-moving air. By contrast in reaction jet helicopters, the rotor shaft is replaced by jet nozzles at the trailing edges of the rotor blade tips. An engine-driven compressor produces compressed air which is discharged/ejected through the jet nozzles, providing thrust which rotates the rotor blades. Since the rotor blades are not connected to a main shaft, no decoupling of the rotor and engine is required prior to entering the autorotation manoeuvre. Furthermore, the rotor blades of reaction jet helicopters are typically heavier than conventional rotor blades, resulting in an increased moment of inertia and kinetic energy during flight. As such reaction jet helicopters provide inherent advantages over shaft-driven helicopters during power-off landings and autorotation manoeuvres.

One problem with prior art reaction jet helicopters stems from their reliance on a single engine and/or primary power system to provide thrust. While in the event of a catastrophic engine failure autorotation may be used to land the helicopter safely, autorotation is only possible when the helicopter is within the safe limits of the helicopter's height-velocity (H-V) diagram. Certain combinations of altitude and airspeed (e.g. low-altitude hover) do not allow sufficient time for the aircraft to enter a stabilised autorotative descent and land safely. While it would be possible to provide a reserve engine and/or compressor system in a tip jet helicopter, such solutions are undesirable due to the increased weight and volume such solutions would entail. There is a requirement for a solution which is lightweight and compact and which can be used to maintain or augment rotor speed in the event of e.g. a power failure during low-altitude, low-airspeed flight (i.e. while the helicopter is within the 'Dead man's curve' of the H-V diagram). Such a solution could be deployed for example to increase airspeed (i.e. to enter the safe region of the H-V diagram), or to augment rotor speed and slow the rate of descent during a flare.

A further problem with prior art reaction jet helicopters lies in their potential inability to navigate towards a safe landing position during power-off flying conditions. In the event of an engine failure, the pilot will need to quickly choose the most appropriate place to safely land the aircraft. Since the engine-off landing will need to be performed immediately, it may not be possible to travel even short distances to the most suitable landing positions. As such, there exists a need for a solution which may be used to keep the aircraft airborne whilst navigating towards a suitable power-off landing position.

Yet further problems arise from the inability of many prior art reaction jet helicopters to augment rotor speed in response to certain operating conditions. For example, during flight it is essential that rotor speed is maintained above a minimum value, below which the rotor will stall and cease to rotate. This could occur in situations where the compressor is not able to deliver an adequate amount of compressed air to the blades, for example if the compressor develops a fault or the compressed gas delivery system develops a serious leak. A solution is needed to avoid such situations.

It is an object of the invention to obviate or mitigate the problems outlined above. In particular, it is an object of the invention to provide a rotating wing aircraft which provides a solution to the problem of engine failure.

It is a further object of the invention to provide a solution to the problem of engine failure which is lighter than a backup engine/compressor and is able to provide yaw control.

It is a further object of the invention to provide a system that can be used to produce a flow of gas in the propulsion system of a rotating wing aircraft.

According to a first aspect of the invention there is provided a rotating wing aircraft comprising: at least one rotor blade; a primary gas-flow production means for providing a flow of gas in an internal passage of the at least one rotor blade; and a reserve gas-flow production means for providing a flow of gas in the internal passage of the at least one rotor blade. Advantageously, the rotating wing aircraft includes two independent means for providing reaction jet propulsion. Safety is increased since in the event of a failure of one of the means for providing reaction jet propulsion, it is possible to use the other means to maintain rotor speed, at least temporarily.

According to a second aspect of the invention there is provided a propulsion system for a rotating wing aircraft, the propulsion system comprising: a primary gas-flow production means for providing a flow of gas in an internal passage of at least one rotor blade: and a reserve gas-flow production means for providing a flow of gas in an internal channel of at least one rotor blade.

According to a third aspect of the invention there is provided a reserve gas-flow production means for producing a flow of gas in an internal passage of at least one rotor blade.

Preferably the rotating wing aircraft is a reaction jet helicopter.

Preferably the rotating wing aircraft comprises a plurality of rotor blades.

Preferably the or each rotor blade is the blade of a rotating wing aircraft.

Preferably the or each rotor blade has an aerofoil-shaped/airfoil-shaped cross section.

Preferably the or each rotor blade comprises proximal, distal, leading and trailing edges.

Preferably the distal edge is that which, in use, is furthest from the body of the rotating wing aircraft.

Preferably the proximal edge is opposite the distal edge.

Preferably the leading edge is the foremost edge of the aerofoil/airfoil.

Preferably the trailing edge is the rear edge of the blade, opposite the leading edge.

Preferably the or each rotor blade comprises a fluid discharge means through which the flow of gas can exit the internal passage.

Preferably the fluid discharge means comprises an aperture.

Preferably the fluid discharge means comprises an aperture located on a trailing edge of the rotor blade.

Preferably the fluid discharge means is located on a distal end of the rotor blade.

Preferably the fluid discharge means is located on a trailing edge of the rotor blade.

Preferably the fluid discharge means comprises a plurality of apertures.

Preferably the rotor blade includes a plurality of apertures.

Preferably the or each fluid discharge means is surrounded by a sheath.

Preferably the fluid discharge means comprises a nozzle located on a trailing edge of the rotor blade Preferably the or each aperture forms part of a jet nozzle.

Preferably the rotor blade(s) each include an input aperture to receive a flow of gas.

Preferably the passage is an internal passage.

Preferably the input aperture is in fluid communication with the passage.

Preferably the or each passage comprises one or more fluid channels.

Preferably gas from the primary gas-flow production means travels through a primary fluid channel and gas from the reserve gas-flow production means travels through a separate, reserve fluid channel.

Preferably the primary gas-flow production means is operable to produce a flow of gas.

Preferably the primary gas-flow production means is operable to produce a flow of air.

Preferably the primary gas-flow production means is operable to produce compressed gas.

Preferably the primary gas-flow production means is a compressor.

Preferably the primary gas-flow production means is a turbine-driven air compressor.

Preferably the flow of gas is produced when compressed gas is exhausted from the primary gas-flow production means.

Preferably the primary gas-flow production means is powered by a primary power source.

Preferably the primary power source is an engine or battery.

Preferably the rotating wing aircraft comprises a gas delivery means.

Preferably the rotating wing aircraft comprises a gas delivery means for delivering gas to the or each blade.

Preferably the gas delivery means delivers gas from the primary gas-flow production and/or reserve gas-flow production means to the passage(s).

Preferably compressed gas is exhausted from the gas flow production means into the gas delivery means.

Preferably the gas delivery means comprises a main conduit.

Preferably the gas delivery means comprises a main conduit in fluid communication with the primary gas-flow production means and the reserve gas-flow production means.

Preferably the main conduit is pipe or tube having a symmetrical cross section.

Preferably the main conduit is pipe or tube having a generally circular cross section.

Preferably compressed gas is exhausted from the gas flow production means into the main conduit.

Preferably the gas delivery means comprises a distributor hub.

Preferably the gas delivery means comprises a distributor hub in fluid communication with the main conduit and the or each rotor blade.

Preferably the distributor hub comprises a receiving aperture.

Preferably the receiving aperture is in fluid communication with the main conduit.

Preferably the flow of gas can travel from the main conduit into the distributor hub via the receiving aperture.

Preferably the distributor hub comprises one or more dispensing aperture(s).

Preferably the distributor hub is in fluid communication with the or each rotor blade(s).

Preferably the flow of gas travels from the distributor hub into the passage(s) via the receiving aperture(s) and input aperture(s).

Preferably the distributor hub is rigidly attached to the or each rotor blade(s).

Preferably the distributor hub is rotatably mounted on the rotating wing aircraft.

Preferably the distributor hub is rotatably mounted on the main conduit.

Preferably the rotor blade(s) are rotatably mounted on the gas delivery means.

Ideally the reserve gas-flow production means is a compressed gas storage means.

Preferably the reserve gas-flow production means comprises a vessel.

Preferably the reserve gas-flow production means comprises a vessel for storing compressed air.

Ideally the reserve gas-flow production means is for compressed air storage.

Preferably the reserve gas-flow production means is a reserve gas tank.

Preferably the reserve gas-flow production means is a pressure vessel comprising a composite material. Preferably the vessel is constructed from a composite material.

Ideally the vessel comprises kevlar or carbon fibre. Preferably the vessel is constructed from kevlar or carbon fibre. Advantageously, the use of a woven composite pressure vessel results in a lightweight and strong unit capable of storing high-pressure compressed gas.

Preferably the reserve gas-flow production means is at least partially pre-filled with compressed gas, for example pre-flight.

Preferably the reserve gas-flow production means is fillable from a source of gas.

Preferably the reserve gas-flow production means comprises a gas intake means for providing a flow of gas into the reserve gas-flow production means.

Preferably the gas intake means is connected to a source of gas.

Preferably the source of gas is the gas flow production means, the output of the compressor or the gas delivery means.

Preferably the source of gas is the primary gas-flow production means.

Preferably the source of gas is the main conduit of the rotating wing aircraft. Advantageously, higher pressure fluid within the main conduit can be bled off when there is an excess not required for rotor thrust.

Optionally the source of gas is the atmosphere within or surrounding the rotating wing aircraft.

Preferably the reserve gas-flow production means comprises a gas intake means.

Preferably the gas intake means is connected to the source of gas.

Preferably the gas intake means is adapted to allow gas to flow from the source of gas to the reserve gas-flow production means.

Preferably the gas intake means comprises one or more gas intake channels or pipes.

Preferably the flow of gas through the gas intake means is controlled.

Preferably the flow of gas through the gas intake means is controlled by an intake control valve.

Preferably the flow of gas through the gas intake means is manually controlled using a manually-operated intake control valve.

Preferably the flow of gas through the gas intake means is electronically controlled using an electrically-operated intake control valve.

Optionally the intake control valve is a butterfly valve, ball valve, needle valve, gate valve or globe valve Ideally the intake control valve is a bleed valve.

Preferably the gas intake means comprises a bleed valve for controlling the flow of gas through the gas intake means.

Preferably a pump is operable to draw gas into the gas intake means.

Preferably the gas intake means comprises a pump for pumping gas into the reserve gas-flow production means.

Preferably the pump is operable to force gas into the reserve gas-flow production means via the gas intake means.

Preferably a proportion of the gas in the main conduit is drawn into the gas intake means by the pump and stored in the reserve gas-flow production means.

Optionally the pump is a diaphragm pump or reciprocating pump.

Ideally the pump is a secondary pump.

Preferably the reserve gas-flow production means comprises a gas outlet means.

Preferably the reserve gas-flow production means comprises a gas outlet means for providing a flow of gas out of the reserve gas-flow production means.

Preferably the gas outlet means is adapted to allow gas to flow from the reserve gas-flow production means.

Preferably the gas outlet means is adapted to allow gas to flow from the reserve gas-flow production means into the propulsion system of the rotating wing aircraft.

Preferably the gas outlet means is adapted to allow gas to flow from the reserve gas-flow production means and into the main conduit or distributor hub of the rotating wing aircraft.

Preferably the gas outlet means is adapted to allow gas to flow from the reserve gas-flow production means to a yaw control means. Advantageously the yaw control means is able to provide yaw control in the event of engine failure.

Preferably the yaw control means comprises yaw jets. Advantageously ejecting compressed gas through the yaw jets provides directional control of the aircraft.

Preferably the gas outlet means comprises one or more gas outlet channels or pipes.

Preferably the flow of gas through the gas outlet means is controlled.

Preferably the flow of gas through the gas outlet means is controlled by an output control valve.

Preferably the gas outlet means comprises an output control valve for controlling the flow of gas through the gas outlet means.

Preferably the output control valve is a manually-operated outlet control valve.

Preferably the flow of gas through the gas outlet means is manually controlled using a manually-operated outlet control valve.

Preferably the flow of gas through the gas outlet means is electronically controlled using an electrically-operated outlet control valve.

Optionally the output control valve is an electrically-operated outlet control valve.

Optionally the outlet control valve is a ball valve, needle valve, gate valve, bleed valve or globe valve Ideally the outlet control valve is a butterfly valve.

Optionally the gas outlet means is adapted to deliver a continuous flow of gas out of the reserve gas-flow production means.

Optionally the gas outlet means delivers a continuous flow of gas from the reserve gas-flow production means into the gas delivery means.

Preferably the gas outlet means is adapted to deliver a pulsed flow of air from the reserve gas-flow production means. Advantageously, delivering the air in pulses means that fluid inlet conditions at nozzle can be optimised to maximise thrust from a finite reserve supply.

Preferably the gas outlet means includes a pulsing means for outputting pulses of compressed gas from the reserve gas-flow production means.

Preferably the pulsing means comprises a pulse valve.

Preferably the pulsing means comprises an electrically-controlled pulse valve.

Preferably the pulsing means comprises a diaphragm valve.

Preferably the pulse valve comprises an inlet chamber comprising an inlet orifice and an outlet chamber comprising an outlet orifice wherein the inlet chamber and outlet chamber are separated by a movable diaphragm.

Preferably the movable diaphragm is biased towards a position to prevent gas flow from the inlet chamber to the outlet chamber and moves to a position which permits gas flow from the inlet chamber to the outlet chamber when there exists a pressure difference therebetween.

Preferably the pulse valve comprises an outlet stopper.

Preferably the outlet stopper is biased to a position which prevents air flow through the outlet orifice and is moveable to a position which permits air flow through the outlet orifice.

Preferably an electromagnet is used to control the position of the outlet stopper.

Preferably the pulsing means comprises a rotating pulsing mechanism.

Preferably the rotating pulsing mechanism comprises a rotating chopper comprising at least one flow aperture and a fixed blanking plate comprising a flow hole.

Preferably gas is permitted to pass through the pulsing means when the flow aperture is aligned with the flow hole.

Preferably the rotating chopper is electrically driven. Advantageously, the electrically driven rotating chopper acts as secondary compression stage.

Preferably the rotating chopper is driven by a motor.

Preferably the rotating chopper is driven by an airfoil which rotates when gas flows through the gas outlet means.

Preferably the airfoil is rigidly attached to the chopper.

Preferably the airfoil is a turbine or propeller.

Preferably the pulsing means for outputting pulses of compressed gas from the reserve gas-flow production means is manually or electrically controlled.

Preferably the pulsing means for outputting pulses of compressed gas from the reserve gas-flow production means is controlled by a computer.

Preferably the pulse rate and pulse width may be controlled using the pulsing means.

Preferably the pressure and/or volume of compressed gas in each pulse may be controlled using the outlet control valve and/or pulsing means.

Preferably compressed gas within the reserve gas-flow production means is used to produce a flow of gas through the propulsion system of the rotating wing aircraft in the event of a predetermined aircraft condition.

Preferably the gas outlet means is adapted to permit gas to be discharged from the reserve gas-flow production means when one or more predetermined aircraft conditions are met.

Preferably gas is automatically discharged from the reserve gas-flow production means when one or more predetermined aircraft conditions are met.

Preferably gas may be discharged from the reserve gas-flow production means only when one or more predetermined aircraft conditions are met.

Preferably a predetermined aircraft condition is met when one or more operating parameters fall within one or more predetermined ranges.

Preferably the predetermined aircraft condition is engine or compressor failure.

Preferably the operating parameters include: gas flow through the gas delivery means; gas flow through the passage(s); gas flow through the aperture(s); pressure in the gas delivery means; pressure in the passage(s); pressure in the rotor blade(s); pressure at the pulsing means inlet(s); pressure at the nozzle inlet(s); airflow through the aperture(s); rotational speed of the rotor blade(s); primary power source output; engine output; and gas-flow production means output.

Preferably the operating parameters are measured using one or more sensors.

Preferably the predetermined range is any value below a predetermined threshold.

Preferably the predetermined range is any value above a predetermined threshold.

Preferably the predetermined range is any value between a predetermined lower threshold and a predetermined upper threshold.

A method of operating a rotating wing aircraft comprising: at least one rotor blade; a primary gas-flow production means for providing a flow of gas in an internal passage of the at least one rotor blade; and a reserve gas-flow production means for providing a flow of gas in the internal passage of the at least one rotor blade, the method comprising providing a flow of gas out of the reserve gas-flow production means.

Preferably the flow of gas is provided to the internal passage of the at least one rotor blade.

Preferably the method comprises providing a flow of gas from the reserve gas-flow production means to at least one yaw jet.

Preferably the flow of gas out of the reserve gas-flow production means is provided when at least one predetermined aircraft condition is met.

Preferably the predetermined aircraft condition is engine or compressor failure.

Preferably a predetermined aircraft condition is met when one or more operating parameters fall within one or more predetermined ranges.

Preferably the operating parameters are measured using one or more sensors.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The invention will now be described with reference to the accompanying drawings which shows by way of example only a main embodiment of an apparatus in accordance with the invention.

Figure 7:
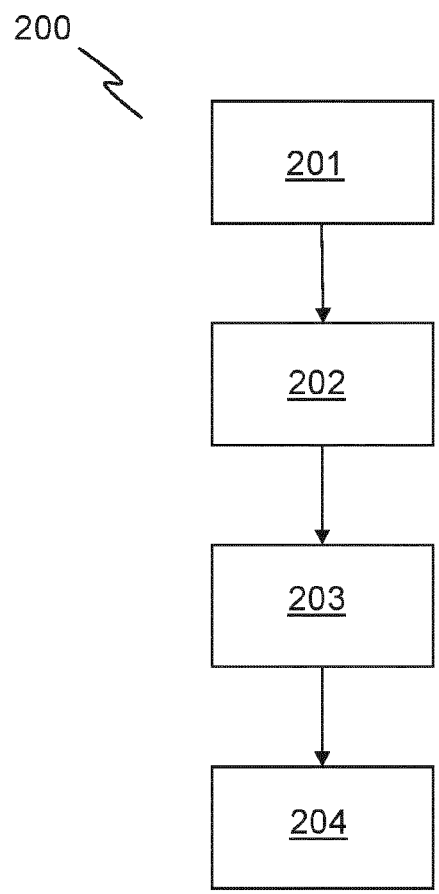

FIG. 7 discloses a method of operating a rotating wing aircraft according to an aspect of the invention.

Figure 1:
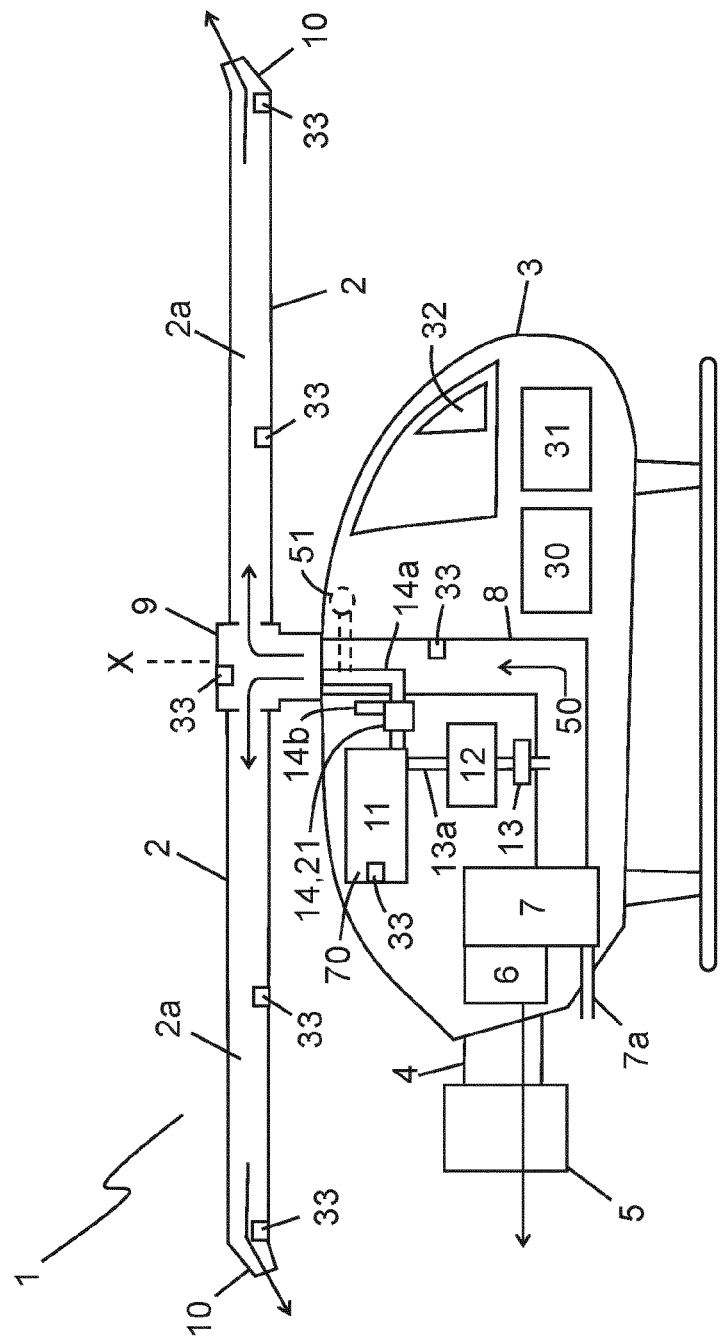
FIG. 1 is a side view of a reaction jet helicopter according to an aspect of the invention.

In FIG. 1 there is shown a rotating wing aircraft according to an embodiment of the invention indicated generally by reference numeral 1. The rotating wing aircraft 1 is a reaction jet helicopter comprising a fuselage 3, engine 6, tail boom 4 and rudder 5. The rotating wing aircraft's propulsion system comprises compressor 7, main conduit 8, distributor hub 9, rotor blades 2 and jet nozzles 10. Compressor 7 is used to convert atmospheric-pressure air, input via a compressor inlet pipe 7a, into compressed gas 50. When compressed gas from compressor 7 is exhausted into a lower-pressure atmosphere, a flow of gas is produced. In the preferred embodiment compressor 7 is a turbine-driven air compressor and is powered by a primary power source in the form of engine 6. The rotating wing aircraft 1 includes a computer 30, a reserve battery supply 31 and a display or gauge 32.

A gas delivery system is used to deliver compressed air from the output of compressor 7 to the rotor blades 2. Shown in FIG. 1, the gas delivery system comprises a main conduit 8 and a distributor hub 9. In use, engine 6 drives compressor 7 to produce compressed air 50 which is then exhausted into main conduit 8. Main conduit 8 is a pipe or tube having a generally circular cross section and which is in fluid communication with both the output of compressor 7 and a receiving aperture in distributor hub 9. A flow of gas travels through the main conduit 8 and into distributor hub 9 via the receiving aperture. The distributor hub 9 comprises one or more dispensing apertures through which gas may flow into the rotor blades 2. Compressed gas travels into the passages 2a within rotor blades 2 via input apertures and is discharged/ejected through jet nozzles 10 located on each rotor blade 2. Each jet nozzle 10 comprises an aperture surrounded by a sheath and is located at a distal end of a rotor blade 2. Distributor hub 9 and rotor blades 2 are rigidly connected and are able to freely rotate together with respect to fuselage 3.

As will be appreciated by the person of skill in the art, air flow is created in the main conduit 8, distributor hub 9 and passages 2a within rotor blades 2 due to the difference in pressure between the gas within the propulsion system, and atmospheric pressure outside of the aircraft.

Figure 2:
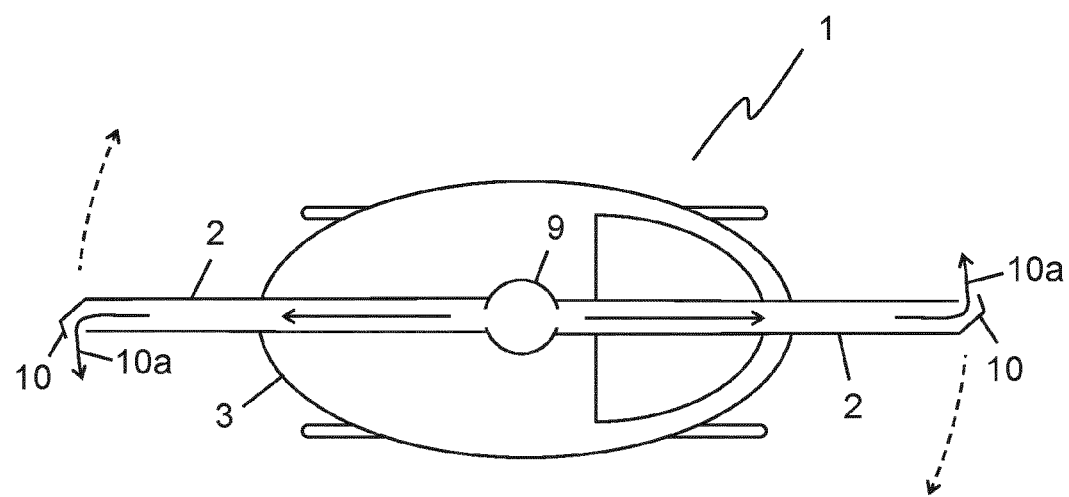
FIG. 2 is a top view of a reaction jet helicopter according to an aspect of the invention.

FIG. 2 is a top view of the aircraft 1 showing the direction of gas flow through the passages 2a inside the rotor blades 2, and out through jet nozzles 10 located at the tips thereof. The release of compressed gas from the tip of each rotor blade 2 provides a force which pushes the blades 2 in a direction opposite to that of the direction of the expelled gas stream 10a. Since the rotor blades 2 are rotatably mounted with respect to the fuselage 3, each rotor blade traces a circular path about an axis X. Dashed lines in FIG. 2 show the rotational direction of the rotors 2 during operation of the aircraft 1. Each rotor blade 2 has an airfoil cross section to provide aircraft lift, side, forward and aft propulsive force. In use, i.e. during flight while the rotor blades 2 rotate, the apertures are located on a trailing edges of the rotor blades 2. During operation, the exhaust from engine 6 is directed over rudder 5 to provide directional control of aircraft 1.

Rotating wing aircraft 1 also includes gas storage reservoir 11 which is a tank or vessel able to store compressed air or other pressurised gas. In the preferred embodiment, gas storage reservoir 11 is a reserve gas tank which is filled with compressed air for use in the aircraft propulsion system in the event of a failure of the primary source of compressed air (i.e. compressor 7). The gas storage reservoir 11 is a lightweight reservoir cylinder (e.g. a woven composite pressure vessel comprising kevlar or carbon fibre) mounted vertically alongside the main conduit 8, sized to supply sufficient gas flow for rotor augmentation in e.g. the final flare phase of autorotation, or longer if more storage space is available.

The size of the pressure vessel will be defined by the time required for safe descent and the thrust required from the nozzles to turn the rotors at the minimum rate to produce sufficient lift for a safe descent. Therefore, the skilled person will appreciate that the overall design of the pressure vessel will be defined by the particular application and a wide range of design specifications will fall within the scope of the invention. As an example, an aircraft which uses approximately 0.5 kg/s of compressed gas for normal operation may use a 20 litre reservoir to store reserve gas at a pressure of 10 bar. Such a reservoir provides a supply of reserved compressed gas for up to approximately 30 seconds.

Prior to flight, gas storage reservoir 11 is at least partially pre-filled with compressed gas such as air or other gas mixture including nitrogen. During operation of the aircraft 1, the gas storage reservoir 11 is filled with further gas taken from the output of compressor 7, the main conduit 8, or from the atmosphere inside or outside of aircraft 1. A gas intake system 13, comprising one or more gas intake channels or pipes 13a, is used to transport gas from one or more of the above sources into the gas storage reservoir 11. The gas intake system includes an intake control valve 13 which is used to regulate the intake of gas into gas storage reservoir 11. The intake control valve 13 is either manually or electronically controlled and in the preferred embodiment takes the form of a bleed valve.

FIG. 1 shows a secondary pump 12 which is used to draw gas from the main conduit 8 into the gas storage reservoir 11. During normal operation, a proportion of the gas in the main conduit 8 is drawn into the gas intake system by pump 12 for storage in the gas storage reservoir 11. Sensors 33 are used to monitor the static pressure within the gas storage reservoir 11 and this information is used to regulate the pressure within the gas storage reservoir 11 at a constant desired value. The pressure information is also provided to the pilot via e.g. a display or gauge 32.

A gas outlet system 14, connected to the outlet of gas storage reservoir 11 and comprising one or more outlet pipes 14a, allows gas to flow from the gas storage reservoir 11 into the gas delivery system, particularly into main conduit 8, distributor hub 9 and/or to yaw jets 51 which can be used to provide directional control of the aircraft 1. An output valve 14 controls the flow of gas through the gas outlet system. In the preferred embodiment, output valve 14 takes the form of an electronically-controlled butterfly valve which can be used to obstruct/allow the flow of air through the gas outlet system. Inclusion of an additional handle or lever 14b which can be used to manually open or close the valve 14 provides a redundant means of opening the valve 14 in the event of a power failure of the electronic control system i.e. the computer 30.

The gas outlet system is used to deliver a continuous or pulsed flow of compressed gas 50 from the from the gas storage reservoir 11 into the gas delivery system (particularly distributor hub 9 and/or main conduit 8). A pulsed flow of compressed gas is produced using a pulsing mechanism 21. Delivering reserve compressed gas in pulses allows the reserve gas in gas storage reservoir 11 to be used in a more controlled manner and can allow an optimised flux of gas.

Figure 3A:
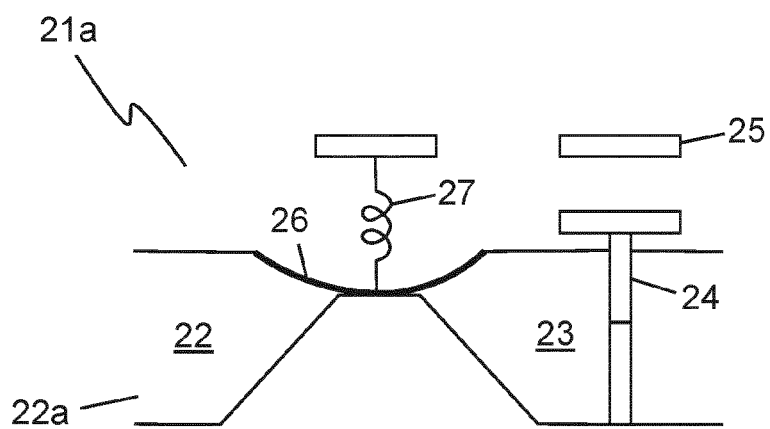
FIG. 3a is a side view of an electrically-controlled pulse valve in a closed position
Figure 3B:
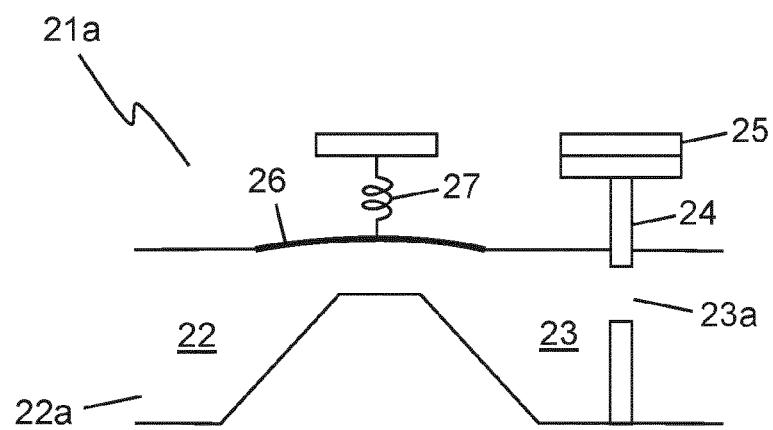
FIG. 3b is a side view of an electrically-controlled pulse valve in an open position.

In a first example shown in FIGS. 3a and 3b, the pulsing mechanism 21 is an electrically-controlled pulse valve 21a comprising an inlet chamber 22 and an outlet chamber 23 having inlet and outlet orifices 22a and 23a, respectively. Compressed gas enters and exits the pulse valve 21 via the inlet and outlet orifices 22a and 23a, respectively. An outlet stopper 24, the position of which is controlled using an electromagnet 25, is used to control the flow of gas through the output orifice 23a and out of the valve 21a. A movable diaphragm 26 separates the inlet and outlet chambers 22,23 and is used to control flow of gas therebetween; a spring 27 biases the diaphragm 26 towards a blocking position where it prevents gas flow between the chambers (FIG. 3a).

In use the outlet stopper 24 is moved from a 'closed' position (FIG. 3a) to an 'open' position (FIG. 3b) for a predetermined period of time. Movement of the stopper 24 towards the open position permits air flow through the outlet orifice 23a, allowing compressed gas in the outlet chamber 23 to be released in single pulse. This venting lowers the pressure in the outlet chamber 23 with respect to the inlet chamber 22. As a result of the pressure difference, a force is exerted on the diaphragm, causing it to move against the spring bias to a position where gas can flow from the inlet chamber 22 into the outlet chamber 23. When the pressure in the chambers 22,23 reaches equilibrium (i.e. the outlet chamber 23 is filled with compressed gas and the outlet stopper 24 is closed), the diaphragm 26 returns to the blocking position. Computer 30 is used to control the operation of the outlet stopper 24 during normal operation of aircraft 1. The stopper 24 defaults to the open position during a power failure and can be permanently set to the open position when continuous flow of air is required.

Figure 4A:
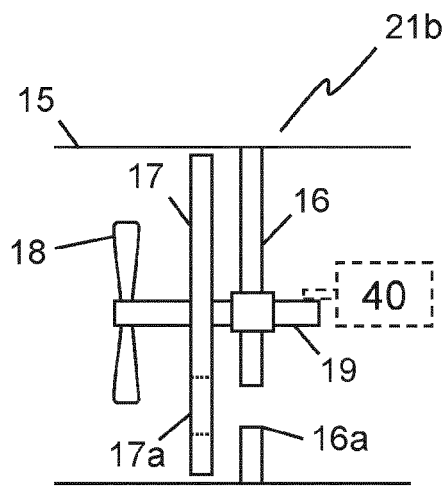
FIG. 4a is a side view of rotating pulsing mechanism.
Figure 4B:
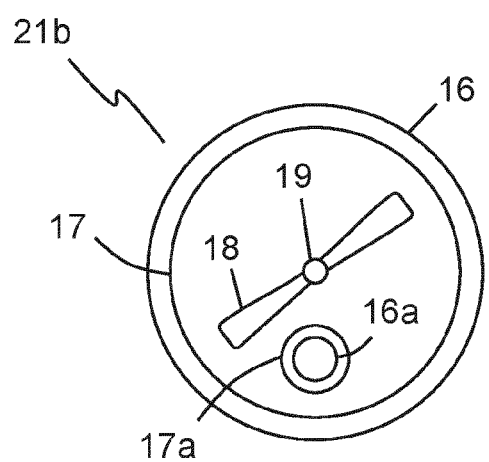
FIG. 4b is a front view of a rotating pulsing mechanism.

A second example of the pulsing mechanism 21 is the rotating pulsing mechanism 21b shown in FIGS. 4a and 4b. The rotating pulsing mechanism 21b comprises a rotating chopper 17 rotatably attached to a blanking plate 16 via an axle 19. As chopper 17 rotates, a flow aperture 17a therein periodically aligns with a flow hole 16a in the blanking plate (see FIG. 4b), allowing a pulse of gas to pass through the outlet channel 15. In the preferred embodiment, rotation of chopper 17 is caused by an airfoil 18 in the form of a propeller which is rigidly attached to the chopper 17. In alternative embodiment, rotation of chopper 17 is electrically driven by a computer-controlled motor 40. Driving the chopper 17 electrically causes the pulsing mechanism/chopper 17 to act as secondary compression stage.

Using the computer 30 of aircraft 1 to control the operation of the pulsing mechanism 21 allows control of the rate (i.e. frequency, measured in Hz) and width (i.e. length of time of pulse, measured in seconds) of pulses. By controlling the flow of gas from the gas storage reservoir 11 using butterfly output valve 14, as well as controlling the pulse rate and pulse width using the pulsing mechanism 21, it is possible to control the pressure and volume of compressed gas in each pulse. In the preferred embodiment aircraft 1 includes a backup source of power, i.e. a reserve battery supply 31, in order to allow control of the electrically controlled pulsing mechanism 21 and/or output valve 14 in the event of a power failure.

In use, compressed gas is discharged from the gas storage reservoir 11. This operation can be effected in the event of a predetermined aircraft condition 100, for example a failure of engine 6 and/or compressor 7. The discharge of compressed gas from the gas storage reservoir 11 into the propulsion system of aircraft 1 produces a flow of gas therein. The resulting high velocity air jets 10a which are exhausted from jet nozzles 10 augment the rotational speed of rotor blades 2. In other words, compressed gas from the gas storage reservoir 11 can provide a redundant or reserve source of thrust which may be used to e.g. keep the aircraft 1 airborne whilst navigating towards a suitable power-off landing position, or augment rotor speed in situations where the engine-driven compressor 7 alone is not able to deliver an adequate amount of compressed air to the rotor blades 2.

Compressed gas 70 from the gas storage reservoir 11 is discharged at some time after the predetermined aircraft condition 100 has occurred, either under the control of a local or remote pilot or automatically under the control of e.g. the main flight computer 30. The reserve thrust provided by the compressed gas within gas storage reservoir 11 can be used to e.g. keep aircraft 1 airborne while seeking a suitable position for an engine-off landing, to augment rotor speed during autorotation or during a flare, or to augment the compressed gas produced by the compressor 7 when performance of the compressor drops, or when a leak develops in the gas delivery system. Furthermore, compressed gas from the gas storage reservoir 11 can be discharged into distributor hub 9 and/or main conduit 8 automatically when the speed of rotor blades 2 falls below a minimum value, and/or when the pressure in distributor hub 9 falls below a predetermined threshold.

Figure 5:
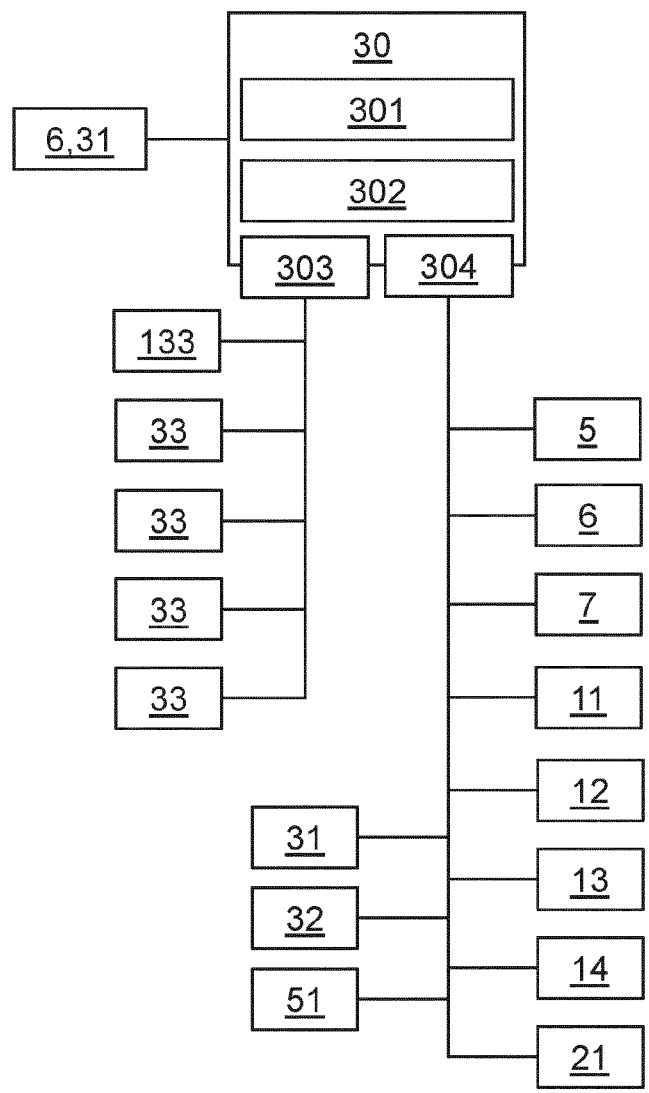
FIG. 5 is a schematic view of a computer for use with an aspect of the invention.

Aircraft 1 includes sensors 33 to measure gas flow through the main conduit 8, distributor hub 9, passages 2a within rotor blades 2 and jet nozzles 10. Aircraft 1 also includes sensors 33 which measure the pressure within main conduit 8, distributor hub 9 and the passages 2a within rotor blades 2, the speed of rotor blades 2 and the performance of engine 6 and compressor 7. FIG. 5 shows a schematic view of computer 30 which is connected to the sensors 33 via input port 303. Flight sensors 133 (accelerometers, altitude sensors, magnetometers and gyroscopes, etc) are also connected to computer 30 via input port 303. Computer 30 includes a processing unit 301, memory 302, input port 303 and output port 304. Computer 30 is powered by the engine 6 or reserve battery supply 31. The computer 30 uses measured data from sensors 33,133 to determine the operating conditions of the aircraft 1 and propulsion system thereof, and controls operation of the rudder 5, engine 6, compressor 7, gas storage reservoir 11, pump 12, intake control valve 13, output valve 14, pulsing mechanism 21, reserve battery 31, display 32 and yaw jets 51.

Figure 6:
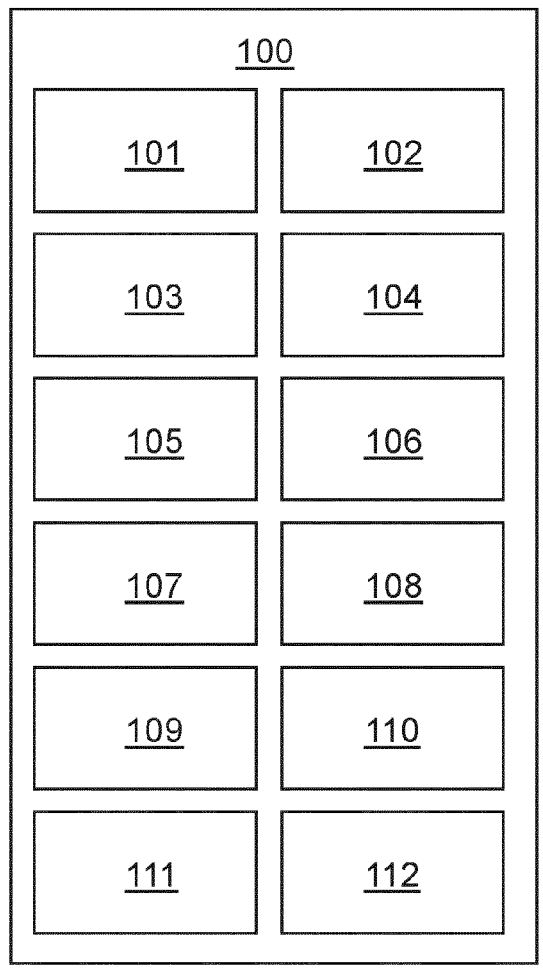
FIG. 6 is a schematic view of predetermined aircraft conditions.

In the case where gas from the gas storage reservoir 11 is to be discharged under the control of a local or remote pilot, in the preferred embodiment this is only permitted (e.g. by the main flight computer 30) when one or more predetermined aircraft conditions 100 are met. The predetermined aircraft conditions 100 are stored in the memory 302 of main flight computer 30. A non-exhaustive list of such predetermined aircraft conditions 100, shown in FIG. 6, include: failure of engine 101; failure of compressor 102; gas flow through the gas delivery system falling below a minimum delivery system gas flow threshold 103; gas flow through the passage(s) falling below a minimum passage gas flow threshold 104; gas flow through the aperture(s)/jet nozzles 10 falling below a minimum aperture/jet nozzle gas flow threshold 105; pressure in the gas delivery system falling below a minimum gas delivery system pressure 106; pressure in the passage(s) falling below a minimum passage pressure 107; rotational speed of the rotor blade(s) falling below a minimum rotational speed threshold 108; primary power source output falling outside of an acceptable primary power source range 109; engine output falling outside of an acceptable engine output range 110; gas delivery system leakages being above a predetermined gas delivery system leakage threshold 111; and compressor output falling outside of an acceptable compressor output range 112.

FIG. 7 discloses a method 200 of operating the rotating wing aircraft 1. The method 200 comprises the steps of: measuring one or more operating parameters using one or more of the sensors 33,133 outlined above (step 201); determining that at least one predetermined aircraft condition 100 is met (step 202); and providing a flow of gas out of the reserve gas-flow production means by e.g. operating outlet control valve 14 (step 203); and providing the flow of gas to the internal passage 13 of at least one of the rotor blades 2 and/or to yaw jets 51 (step 204).

While the invention has been set out by way of a main embodiment, above, a number of alternatives are also available which lie within the scope of the invention. For example, each rotor blade 2 could include a plurality of apertures and engine 6 could be replaced with a battery 6 to provide primary power. Furthermore, each passage 2a in each rotor blade 2 could include a plurality of fluid channels in the form of pipes, tubes or conduits. In such cases gas from the gas-flow production means travels through a primary fluid channel toward the aperture(s) and gas from the reserve gas-flow production means travels through a reserve fluid channel towards the aperture(s). Main conduit 8 could have any suitable cross section which allows a sufficient flow of gas. Optionally intake control valve 13 may be any of a ball valve, needle valve, gate valve or globe valve and the outlet control valve 14 may be any of a ball valve, needle valve, gate valve, bleed valve or globe valve. Pump 12 may be any suitable pump, such as a diaphragm pump or reciprocating pump. Gas-tight fittings within the aircraft may be sealed using o-rings or other suitable sealing means.

Compressor 7 could be replaced with an alternative source of gas flow, for example one or more pre-filled gas tanks 7 which provide a limited supply of compressed gas. While gas from the gas storage reservoir 11 is shown to be delivered into distributor hub 9, gas could equally be delivered into the main conduit 8 or the output of compressor 7.

In the preceding discussion of the invention, unless stated to the contrary, the disclosure of alternative values for the upper or lower limit of the permitted range of a parameter, coupled with an indication that one of the values is more highly preferred than the other, is to be construed as an implied statement that each intermediate value of the parameter, lying between the more preferred and the less preferred of the alternatives, is itself preferred to the less preferred value and also to each value lying between the less preferred value and the intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof.

The invention claimed is:

1. A rotating wing aircraft comprising: at least one rotor blade; a primary gas-flow production means for providing a flow of gas in an internal passage of the at least one rotor blade; and a reserve gas-flow production means for providing a flow of gas in the internal passage of the at least one rotor blade wherein the reserve gas-flow production means comprises a gas outlet means for providing a flow of gas out of the reserve gas-flow production means, wherein the gas outlet means is adapted to deliver a pulsed flow of gas out of the reserve gas-flow production means.

2. A rotating wing aircraft according to claim 1, wherein the or each rotor blade comprises a fluid discharge means through which the flow of gas can exit the internal passage.

3. A rotating wing aircraft according to claim 2, wherein the fluid discharge means comprises an aperture located on a trailing edge of the rotor blade.

4. A rotating wing aircraft according to claim 2, wherein the fluid discharge means comprises a nozzle located on a trailing edge of the rotor blade.

5. A rotating wing aircraft according to claim 1, wherein the primary gas-flow production means is a compressor.

6. A rotating wing aircraft according to claim 1, wherein the reserve gas-flow production means is a compressed gas storage means.

7. A rotating wing aircraft according to claim 6, wherein the reserve gas-flow production means comprises a vessel for storing compressed air.

8. A rotating wing aircraft according to claim 7, wherein the vessel is constructed from a composite material.

9. A rotating wing aircraft according to claim 8, wherein the vessel is constructed from kevlar or carbon fibre.

10. A rotating wing aircraft according to claim 1, wherein the reserve gas-flow production means comprises a gas intake means for providing a flow of gas into the reserve gas-flow production means.

11. A rotating wing aircraft according to claim 10, wherein the gas intake means is connected to a source of gas.

12. A rotating wing aircraft according to claim 11, wherein the source of gas is the primary gas-flow production means.

13. A rotating wing aircraft according to claim 11, wherein the source of gas is the main conduit of the rotating wing aircraft.

14. A rotating wing aircraft according to claim 1, wherein the reserve gas-flow production means comprises a gas outlet means for providing a flow of gas out of the reserve gas-flow production means.

15. A rotating wing aircraft according to claim 14, wherein the gas outlet means is adapted to allow gas to flow from the reserve gas-flow production means and into the main conduit or distributor hub of the rotating wing aircraft.

16. A method of operating a rotating wing aircraft, the rotating wing aircraft comprising: at least one rotor blade; a primary gas-flow production means for providing a flow of gas in an internal passage of the at least one rotor blade; and a reserve gas-flow production means for providing a flow of gas in the internal passage of the at least one rotor blade, wherein the reserve gas-flow production means comprises a gas outlet means for providing a flow of gas out of the reserve gas-flow production means, wherein the gas outlet means is adapted to deliver a pulsed flow of gas out of the reserve gas-flow production means.

17. A method of operating a rotating wing aircraft according to claim 16, wherein the flow of gas is provided to the internal passage of the at least one rotor blade.

18. A method of operating a rotating wing aircraft according to claim 17, the method comprising providing the flow of gas out of the reserve gas-flow production means when at least one predetermined aircraft condition is met.

19. A method of operating a rotating wing aircraft according to claim 18, wherein the predetermined aircraft condition is engine or compressor failure.

* * * * *